April 10, 1934.  F. J. VLCHEK  1,954,157
DROP HAMMER
Filed Aug. 22, 1931  5 Sheets-Sheet 4

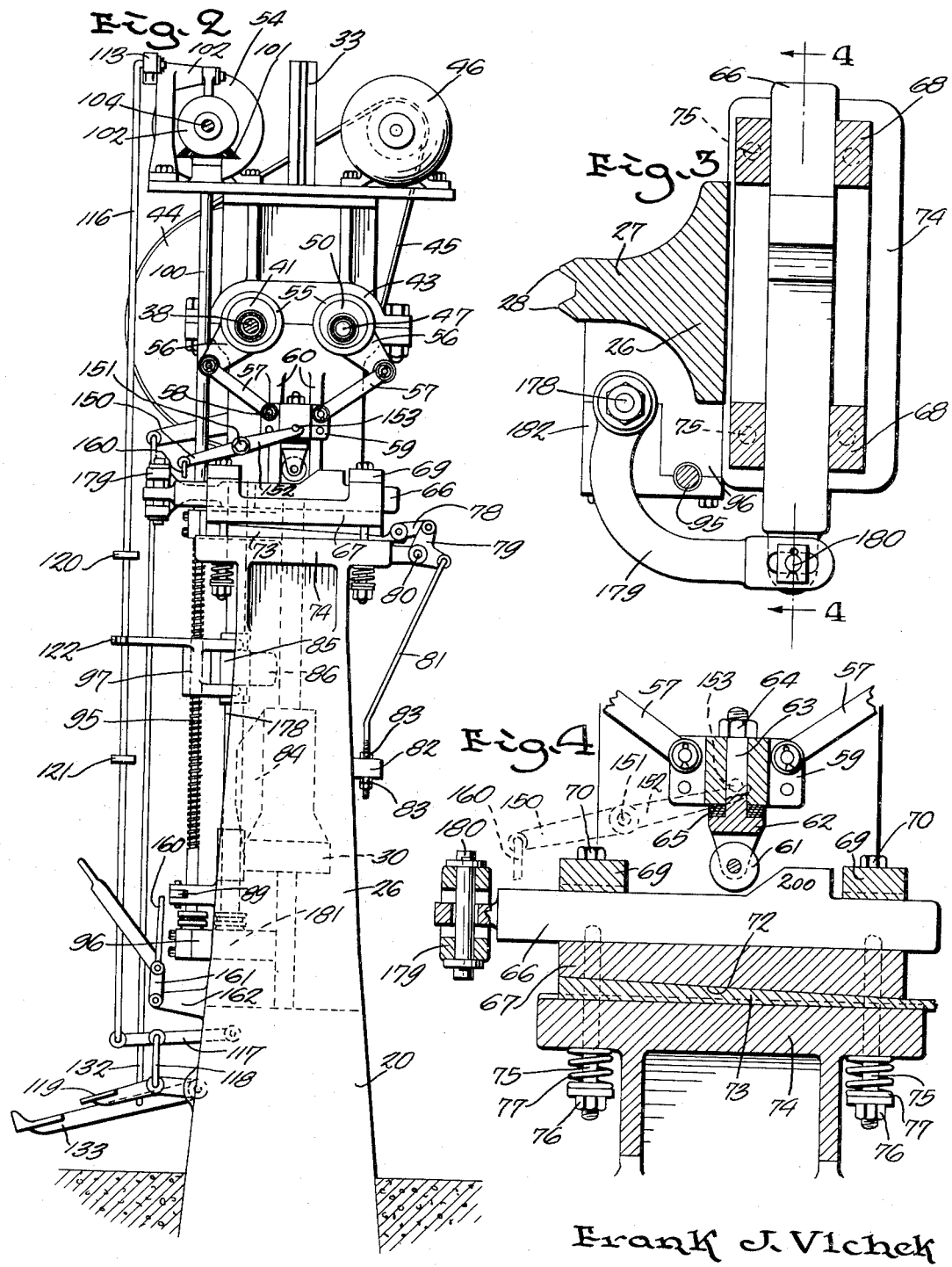

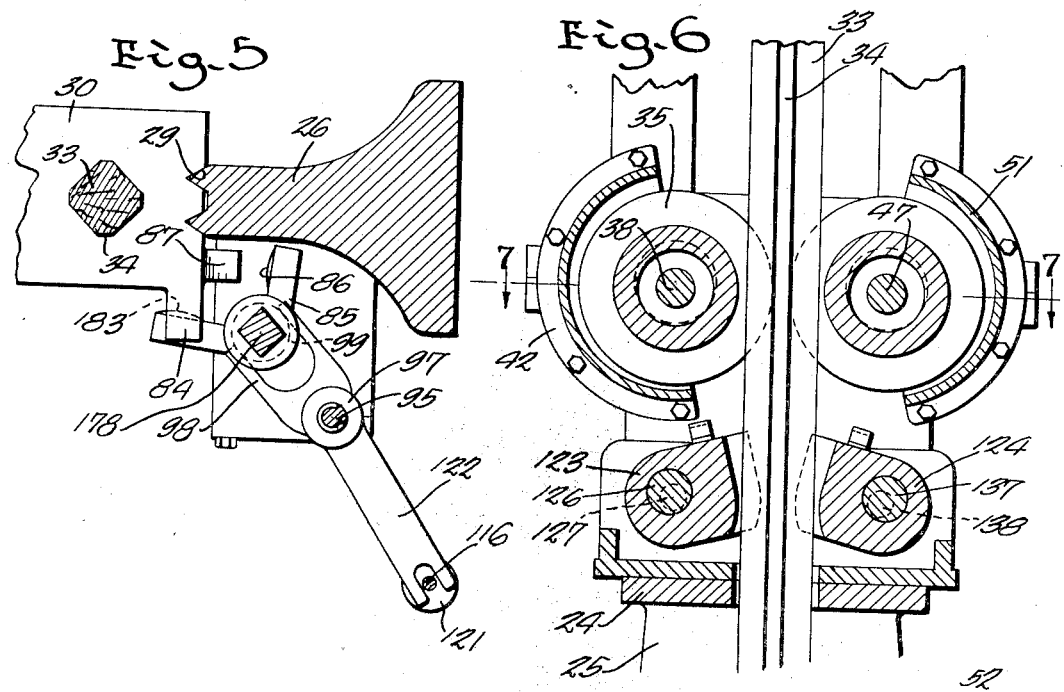
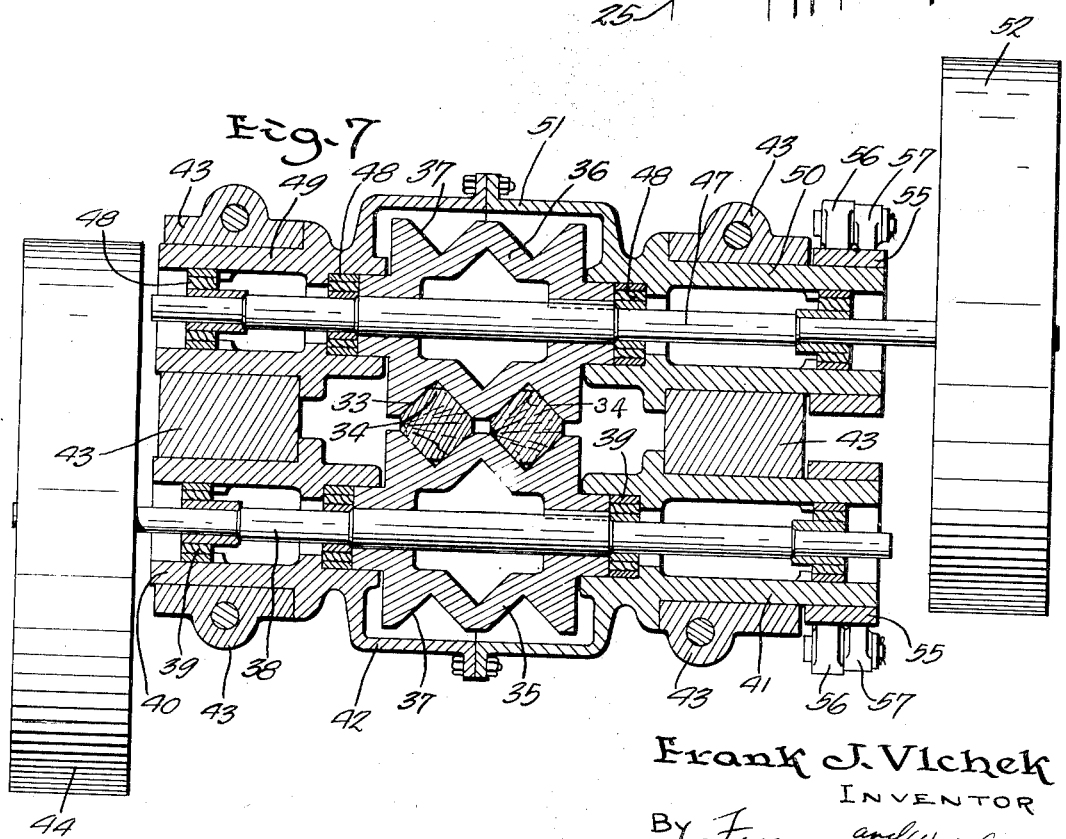

Frank J. Vlchek
INVENTOR
BY Freeman and Weidman
ATTORNEYS

April 10, 1934.    F. J. VLCHEK    1,954,157
DROP HAMMER
Filed Aug. 22, 1931    5 Sheets-Sheet 5

Frank J. Vlchek
INVENTOR
BY Freeman and Weidman
ATTORNEYS

Patented Apr. 10, 1934

1,954,157

UNITED STATES PATENT OFFICE 1,954,157

DROP HAMMER

Frank J. Vlchek, Cleveland, Ohio, assignor to The Vlchek Tool Company, Cleveland, Ohio, a corporation of Ohio Application August 22, 1931, Serial No. 558,713

7 Claims. (Cl. 78—29)

This invention relates to drop hammers and has for an object the provision of a new and improved construction of this type.

In the drawings accompanying this specification and forming a part of this application I have shown, for purposes of illustration, one form which my invention may assume, and in these drawings:

Figure 2 is a side elevational view of said embodiment,

Figure 1:
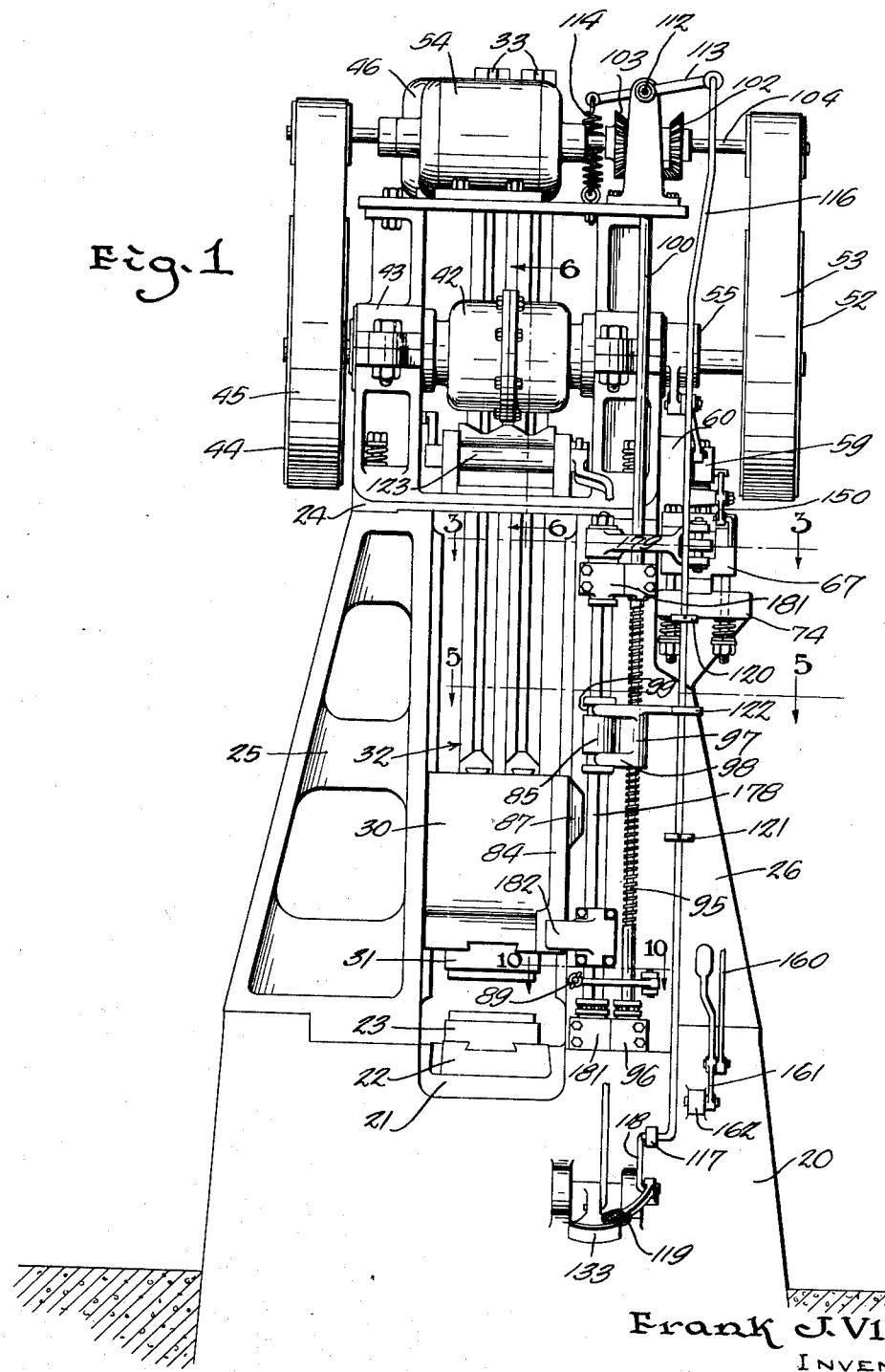
Figure 1 is a front elevational view of an embodiment of the invention.
Figure 8:
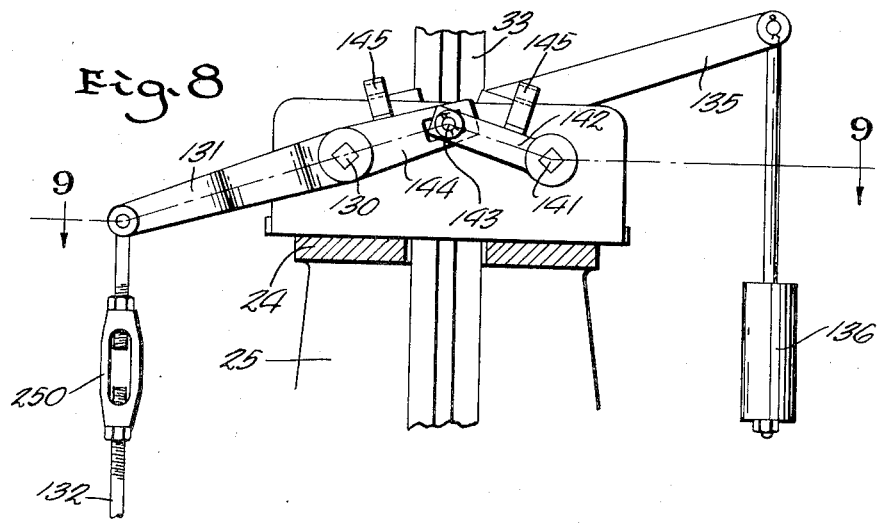
Figure 9:
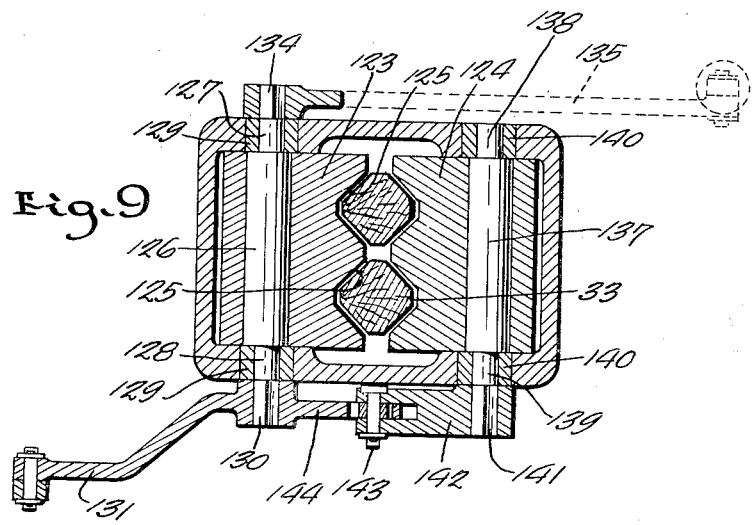
Figure 10:
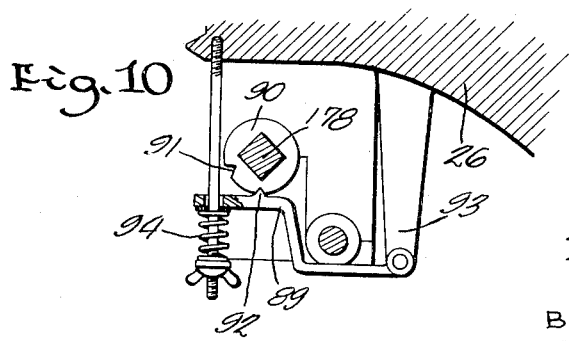
Figure 11:
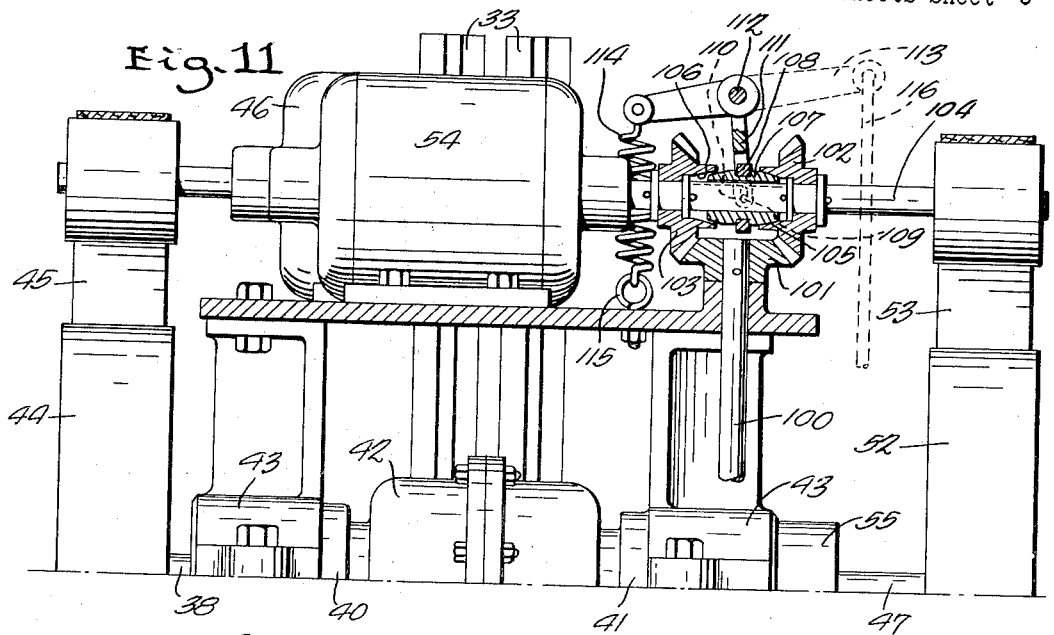
Figure 12:
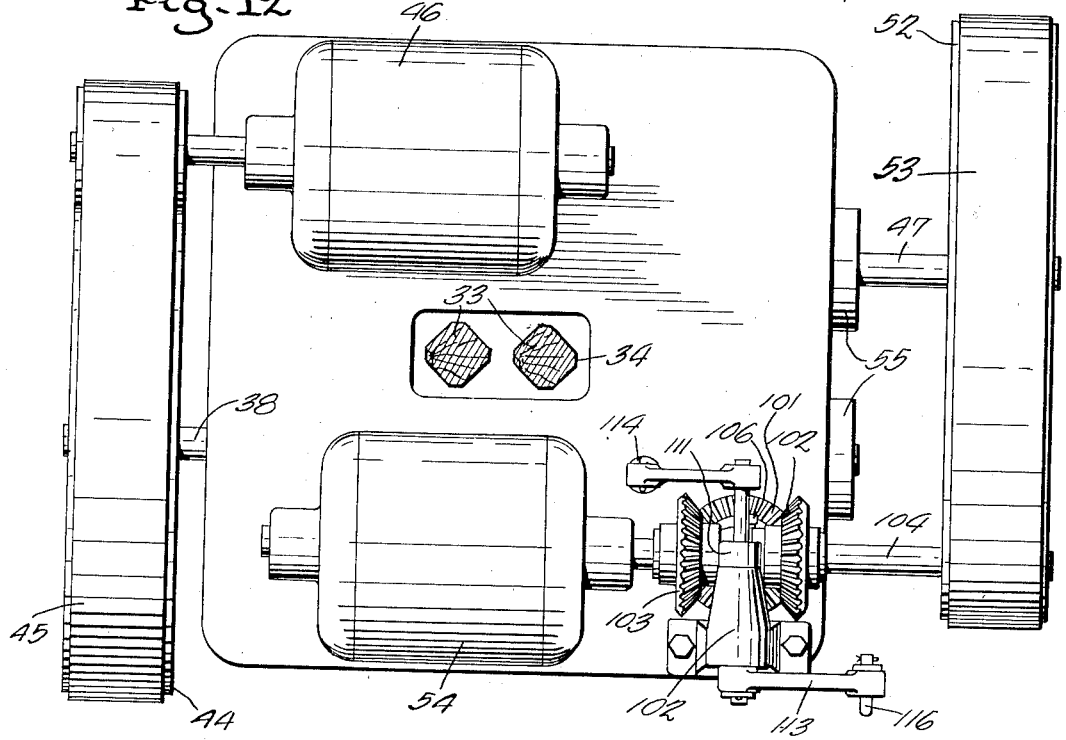

Figure 3 is an enlarged fragmentary horizontal sectional view corresponding substantially to the line 3—3 of Figure 1, Figure 4 is an enlarged fragmentary vertical sectional view corresponding substantially to the line 4—4 of Figure 3, Figure 5 is an enlarged fragmentary horizontal sectional view corresponding substantially to the line 5—5 of Figure 1, Figure 6 is an enlarged fragmentary vertical sectional view corresponding substantially to the line 6—6 of Figure 1, Figure 7 is an enlarged horizontal sectional view corresponding substantially to the line 7—7 of Figure 6, Figure 8 is a fragmentary enlarged side elevational view of the clamping mechanism employed in connection with the invention, Figure 9 is an enlarged horizontal sectional view corresponding substantially to the line 9—9 of Figure 8, Figure 10 is an enlarged horizontal sectional view corresponding substantially to the line 10—10 of Figure 1, Figure 11 is an enlarged fragmentary vertical sectional view, disclosing the clutch mechanism employed in said embodiment and also disclosing parts of cooperating mechanism, while Figure 12 is an enlarged plan view of the construction disclosed in Figure 11.

The embodiment of my invention herein shown comprises a base support 20 which may be sunk a suitable distance into a floor to provide a firm anchorage therefor, and the base 20 is provided with a platform 21 for the accommodation of a die support 22 carrying a die 23. Secured to the upper portion of the base support 20, and reaching upwardly therefrom to a connecting head 24, are spaced standards 25 and 26, each of these standards being substantially T-shaped in cross-section, as best shown in Figures 3 and 5, with the stems 27 disposed inwardly and providing projections 28 receivable in guide grooves 29 formed in a hammer head 30, the latter being adapted to be reciprocated between the standards 25 and 26 as will be understood, and carrying a suitable die 31 adapted for cooperation with the die 23 carried by the die support 22. The upper end of the hammer head 30 has secured thereto tailpiece means 32, which may comprise a pair of spaced boards 33, each substantially rectangular or diamond-shaped in cross-section, providing V-shaped contours with the corners truncated as indicated at 34, the boards 33 extending upwardly through suitable openings in the head 24 and into engagement with hammer actuating means.

The hammer actuating means (Figures 6, 7, 11 and 12) comprises a pair of rolls 35 and 36 mounted in the head 24, and each roll is provided with a pair of V-shaped grooves 37 which accommodate the cross-sectional contour of the boards 33. The roll 35 is fixedly mounted upon a shaft 38, the outer ends of which are supported by means of antifriction bearings 39, eccentrically carried by cylindrical bearing members 40 and 41 forming part of the connected housing members 42, and rotatably journalled in bearing supports 43, the shaft 38 having a pulley 44 adapted to be connected by a suitable belt 45 to a motor 46. The roll 36 is fixedly secured to the shaft 47, supported in antifriction bearings 48, eccentrically carried in cylindrical bearing members 49 and 50 forming part of the connected housing members 51, and the bearing members 49 and 50 are rotatably journalled in the supports 43, and the shaft 47 has a pulley 52 secured thereto, adapted to be driven by a belt 53 through connection with the motor 54. The two roller constructions are identical, and are so mounted that when the cylindrical bearing members 40 and 41, and 49 and 50 are rotated outwardly in opposite directions, the rolls 35 and 36 separate, releasing the tailpieces 33, and when rotated inwardly toward each other, reengage the tailpieces 33.

Each of the cylindrical bearing members 41 and 50 projects outwardly beyond the adjacent supporting member 43, and each has a collar 55 rigidly affixed thereto and provided with a crank 56, at its outer end pivotally secured to one of the links 57, and the opposite ends of said links 57 are pivotally connected, as at 58, to a reciprocating block 59 mounted for vertical reciprocation in guides 60 provided upon the head 24 of the apparatus. The block 59 (Figure 4) carries a roller 61 disposed between furcations of the end portion 62 forming part of a post 63 extending through a vertical bore in the block 59, and secured in position by a nut 64, shims 65 being interposed between the portion 62 and the under surface of the block 59 to provide for adjustment in the position of the roller 61. This mechanism provides interconnected lever means which act in a manner similar to toggle levers to oscillate the bearings 40, 41, 49 and 50 in opposite directions, and effect simultaneous approach or recession of both of the rolls 35 and 36 with reference to the tail boards 33.

Cooperating with block 59 and associated mechanism is a slide bar 66 having a cam 200 thereon, and the slide bar 66 is mounted for reciprocation in a supporting member 67, having spaced walls 68 at opposite ends, between which the slide bar 66 extends, and the slide bar 66 is held in position by plates 69 extending across the end portions of the slide bar 66 and secured in position by screw bolts 70. The lower portion of the supporting member 67 is reduced in width, and its lower surface is inclined, as indicated at 72, and the inclined surface 72 is adapted to cooperate with an oppositely inclined surface of a wedge member 73, the supporting member 67 being attached to a shelf 74 on the frame of the machine through the medium of four studs 75 carried by said supporting member and extending through the shelf 74, each of the studs 75 having a nut 76 on its lower extremity, and each stud 75 having a coiled spring 77 interposed between the nut 76 and the under surface of the shelf 74. The wedge member 73 is adapted to be adjusted longitudinally, and for this purpose has a link 78 pivotally connected thereto and to one arm of a bell crank lever 79, pivoted as at 80 to the frame, and the other arm of the bell crank lever has a rod 81 connected thereto and passing through an ear 82 formed on the frame and adjustably held in position by nuts 83 flanking the ear 82. By this construction the horizontal path of reciprocation of the slide bar 66 may readily be adjusted with reference to operating level of the block 59 and roller 61.

Motion is transmitted to the slide bar 66 through the medium of an oscillatable rod 178 having at its upper end a horizontally extending crank portion 179, which at its outer end has a pin and slot connection 180 with the slide bar 66, whereby oscillation of the rod 178 serves to impart reciprocating movement to the slide bar 66.

The oscillatable rod 178 extends substantially parallel to and at one side of the path of movement of the hammer head 30, and is rotatably supported adjacent its ends by bearings 181 carried by the adjacent standard 26, and is non-circular in cross-section intermediate its ends. Adjacent the lower end of the rod 178 is adjustably fixed a cam member 182 having a cam portion 183 adapted to be engaged by a cam 84 formed on the hammer head 30, these cams 183 and 84 being so spaced that descent of the hammer head 30 causes engagement of the cams 183 and 84 and serves to impart oscillation to the rod 178 in a counter-clockwise direction. This movement of the rod 178 moves the slide bar 66 and cam 200 toward the right, as viewed in Figure 4, so as to permit descent of the block 59 and reengagement of the rolls 35 and 36 with the boards 33, thus to effect elevation of the hammer head 30.

Slidably and non-rotatably mounted upon the rod 178 is a second cam member 85 having a cam portion 86 arranged in a reverse manner to the cam 183 and adapted to engage a second cam 87 on the hammer head 30 when the latter is elevated, the cams 86 and 87 being so located that upward movement of the hammer head 30 imparts a clockwise movement to the rod 178 resulting in movement of the slide bar 66 and cam 200 toward the left, as viewed in Figure 4, and causing the cam 200 on the slide bar 66 to ride beneath the roller 61, elevating the block 59, and through the levers 56 and 57 rotating the bearing 41 and 50 to separate the rolls 35 and 36, and thus permit the hammer head 30 to drop.

In order to control the rod 178 against accidental movement a latch member 89 is provided for cooperation with a collar 90 mounted at the lower end of the rod 178, and the collar 90 is provided in its periphery with a pair of notches 91 adapted for accommodation of a tooth 92 on the latch 89. The latch 89 is pivoted at one end to a bracket 93 on the adjacent standard 26, and at its opposite end is resiliently pressed toward the collar 90 by a spring device 94. When the rod 178 is oscillated to the limit of its movement in one direction, the tooth 92 will engage one of the notches 91, and when the rod 178 is positively moved to the limit of its movement in the opposite direction, the tooth 92 will engage the other notch 91, thereby preventing accidental movement of the rod 178.

The cam member 85 may be set in various fixed adjusted positions vertically of the rod 178, during operation of the hammer, by manipulation of means convenient to the operator. Means for accomplishing this purpose comprises a screw 95 rotatably supported in bearings 96 carried by the adjacent standard 26, and threaded upon the screw 95 is a nut 97 provided with upper and lower forked portions 98 rotatably engaging upper and lower grooved portions 99 of the cam member 85, whereby rotation of the screw 95 effects vertical travel of the nut 97 and of the cam member 85 with respect to the rod 178, while permitting the required oscillation of the rod 178, thereby allowing adjustment and variation of the stroke of the hammer head 30 during operation of the machine.

Automatic means are provided for controlling rotation of the screw 95 first in one direction and then the other, to raise or lower the nut 97, and thereby regulate the length of stroke of the hammer head 30, and said means comprises an extension 100 upon the screw 95, having a beveled gear 101 secured thereto and meshing with beveled gears 102 and 103 rotatably mounted upon the motor drive shaft 104, the gear 102 having a conical recess in its inner face providing a conical clutch surface 105, and the gear 103 having a similar recess providing a clutch surface 106, and disposed between the gears 102 and 103, and splined to the shaft 104 is a tapered clutch member 107 having a tapered clutch surface engageable with the clutch surface 105 of the gear 102, and a tapered clutch surface engageable with the clutch surface 106 of the gear 103, it being apparent that one or the other of the gears 102 and 103 may drive the beveled gear 101 and rotate the screw 95 in one direction or the other, depending upon whether it is desired to elevate or lower the nut 97. The clutch member 107 has a collar 108 affixed thereto and provided with projecting pins 109 adapted for the reception of slotted portions 110 of a shifting fork 111, pivotally supported as at 112, and the fork 111 is adapted to be oscillated by a rocking lever 113 connected thereto, one end of said lever 113 having a tension spring 114 connected thereto and to the frame of the machine as at 115, while the opposite end of the rocking lever 113 is connected to one end of an operating rod 116 which extends downwardly, and is connected to the outer end of a lever 117 pivotally connected by a link 118 to a relatively small foot pedal 119, pivoted to the base 20. Secured to the rod 116 are limit stops 120 and 121 adapted to be engaged by a projection 122 on the nut 97 and operable to shift the rod 116 in the direction in which the nut 97 is moving, and thereby cause the shifting fork 111 to automatically shift the clutch member 107 into neutral position at the upper and lower limits of movement of the nut 97.

Means are provided for manually disconnecting the rolls 35 and 36 from the tailpieces 33, such means comprising a lever 150 pivotally mounted upon the frame of the machine, as at 151, having an arm 152, provided with a notch adapted to accommodate a pin 153 carried by the block 59, and said lever is adapted to be operated by a rod 160 pivotally connected to a lever 161, the latter being pivoted to a bracket 162, and the lever 161 is so arranged that when it is swung downwardly, it acts in the manner of a toggle, moving the lever 150 to elevate the block 59, and separating the rolls 35 and 36 to release the tailpieces 33, and then locking the block 59 in elevated position through the toggle action referred to.

Means are also provided for engaging the tail board means 33 of the hammer 30 to arrest movement of the hammer and support the same in elevated position. Such means comprising a pair of opposed clamps 123 and 124, each of which is provided with a pair of V-shaped grooves 125 adapted to accommodate the V-shaped contours of the tail boards 33. The clamp 123 is pivotally mounted upon a cylindrical shaft 126 having eccentrically disposed trunnions 127 and 128 rotatably supported in bearings 129, the trunnion 128 having an extension 130 non-circular in cross-section for the reception of a non-circular opening formed in an operating lever 131, the outer end of said lever 131 being connected by a rod 132 with a foot pedal 133, and the foot pedal 133 is disposed adjacent to the pedal 119, so that the operator may conveniently employ one foot to operate the pedal 133 and the toe of the same foot to operate the pedal 119, and the rod 132 has a turnbuckle 250 providing for necessary or desirable adjustments. The trunnion 127 of the shaft 126 is also provided with a non-circular portion 134 to which is connected an arm 135 at its outer end carrying a weight 136, normally tending to hold the clamp 123 in engaged position. The clamp 124 is also pivotally mounted upon a shaft 137 similar to the shaft 126, and has eccentric trunnions 138 and 139 mounted in bearings 140, and the trunnion 139 is provided with a non-circular extension 141 adapted for the reception of a crank arm 142 connected by a pin and slot connection 143 with an extension 144 upon the lever 131, movement of the lever 131 resulting in movement of the arm 142. Each of the clamps 123 and 124 is provided with a lateral extension 145 adapted to be engaged by the arms 144 and 142 when said arms have been sufficiently elevated, thereby swinging the clamps 123 and 124 pivotally about the shafts 126 and 137 respectively, away from the tail boards 33, this operation being controlled by the foot pedal 133.

In operation, assuming the rolls 35 and 36 to be revolving in opposite directions, and in engagement with the boards 33, and the clamps 123 and 124 separated or retracted, the hammer head 30 will be elevated, and such elevation continued until the cam 87 comes into contact with the cam 86, such engagement causing the oscillatable rod 178 to move in a clockwise direction, and through the arm 179 moving the slide bar 66 to the right as shown in Figure 4, causing the cam 200 on the slide bar to ride beneath the roller 61, and elevate the block 59, and elevation of the block 59 through the levers 56 and 57 causes rotation of the bearings 41 and 50 in opposite directions, and separation of the rolls 35 and 36 with respect to the tailpieces 33, permitting the hammer 30 to drop. When the hammer head 30 approaches the limit of its downward movement the cam 84 of the hammer head 30 comes into contact with the cam 183 of the cam member 182, which effects movement of the oscillatable rod 178 in a counter-clockwise direction, and through the crank arm 179 moves the slide bar 66 to the right as shown in Figure 4, permitting the roller 61 to roll down the cam surface 200, and the block 59 to descend, causing reengagement of the rolls 35 and 36 with the tail boards 33, and effecting subsequent elevation of the hammer head 30, it being understood that the rolls 35 and 36 are urged to engagement with the tailpieces 33 through influence of gravity exerted thereon by the housing members 42 and 51, cranks 56, links 57, block 59, post 63 and roller 61.

The means for regulating the stroke of the hammer during operation are a great value especially at the inception of the forging operation when it is desired to begin work with a series of short strokes and then gradually to increase the length of such strokes. When the hammer is elevated to its uppermost position to deliver its maximum stroke, such as required at the end of an operation, and the cam arm 85 is likewise disposed substantially at its maximum elevation, and no additional strokes are desired, the operator takes his foot off of the pedal 133 and the clamps 123 and 124 engage the tailpiece means 33 and hold the hammer elevated, and the finished piece of work may then be removed. The operator, then, in preparing for the next operation, and before the next piece of work is inserted into the machine, places his foot momentarily upon the pedal 133 and by expert manipulation will permit the tailpiece means 33 to slide through the clamps 123 and 124 and drop to a point short of engagement with the cam arm 182; or, if desired the hammer unit may be dropped through an idle stroke by disconnecting the clamps 123 and 124 from the tailpiece means 33 by depression of the foot pedal 133.

Meanwhile the cam arm 85 has automatically returned substantially to its lowermost position, and remains substantially in this position until the operator desires to increase the stroke. This action occurs through the automatic operation of the means for controlling rotation of the screw 95. It will be noted that the clutch member 107 is normally urged by the spring 114 in a direction to engage the beveled gear 102 which rotates the screw 95 in a direction to cause lowering of the cam arm 85 and this rotation continues until the extension 122 on the nut 97 contacts the collar 121 on the rod 116 which shifts the clutch member 107 into neutral position, and stops rotation of the screw 95, thereby maintaining the cam arm 85 at its lower position, so that short strokes desired at the inception of the forging operation may immediately be obtained. The foot pedal 133 may now again be depressed by the operator to release the clamps 123 and 124 and a series of short strokes delivered, the mechanism operating automatically, governed by the cam mechanism above described. When the operator desires longer strokes he uses the toe of the same foot in engagement with the pedal 133 to depress the pedal 119 and such depression causes engagement of the clutch member 107 with the gear 103, and rotation of the screw 95 in a direction to elevate the cam member 85 to the adjusted position desired by the operator, who will then relieve the pressure on the pedal 119 to permit the clutch member 107 to occupy a neutral position between the gears 102 and 103; if however, the operator fails to relieve the pressure and maintains the same pressure on the pedal 119, the nut 97 will rise until the extension 122 thereon strikes the collar 120 on the rod 116, and against the pressure of the foot, of the operator raise the rod 116 and move the clutch member 107 into neutral position, and when the operator takes his foot off the pedal 119, influence of the spring 114 re-establishes engagement of the clutch member 107 with the gear 102, and causes the nut 97 and cam arm 85 to descend to initial position.

The clamps 123 and 124 are normally urged into engagement with the boards 33 under the influence of gravity operating through the arm 135 and weight 136, and the connecting arms 144 and 142, and are adapted to be retracted by depression of the pedal 133 as already stated. Such depression of the foot pedal 133 causes downward movement of the rod 132, counter-clockwise movement of the lever 131, rotation of the trunnion 128, shaft 126, and trunnion 127, and due to the eccentric movement of the shaft 126 the clamp 123 will be horizontally retracted from engagement with the tailpiece means 33, and additional movement of the lever 131 will cause the arm 144 to come into contact with the projection 145 on the clamp 123 and rotate said clamp upwardly about the shaft 126 as a pivot. The arm 144 transmits movement of the lever 131 to the arm 142, which in turn rotates the shaft 137 about its eccentric trunnions 138 and 139, causing simultaneous withdrawal of the clamp 124 from the tailpieces 33, and continued movement of the arm 142 brings about contact between said arm and the projection 145 on the clamp 124, which causes the clamp 124 to be rotated outwardly and upwardly about the axis of the shaft 137. The hammer unit may be arrested at any elevated position by releasing the foot pedal 133, bringing about reversal of the movements of the clamp mechanism described and causing engagement of the clamps 123 and 124 with the boards 33, thereby preventing the hammer unit from continuing its descent.

It will be understood by those skilled in the art that the embodiment herein described accomplishes at least the principal object of the invention; and it will further be understood that said embodiment is capable of uses and has advantages other than those herein particularly pointed out, and it will also appear that various changes and modifications may be made without departing from the spirit of the invention, and consequently the embodiment herein disclosed is illustrative only and the invention is not limited thereto.

I claim:

1. A drop hammer mechanism, comprising: a hammer unit, including a hammer, opposed rolls mounted upon eccentric bearings, approachable with reference to said hammer unit to engage and elevate said hammer unit, and separable to disengage, and permit said hammer unit to drop; roll actuating means operable to effect relative approach and separation of said rolls; control means, controlled by movement of said hammer, and having a guide; a reciprocable cam sliding along said guide and operable to impart movement to said roll actuating means; and a wedge member operable to adjust the height of said guide to adjust to operative position of said reciprocable cam with reference to said roll actuating means.

2. A drop hammer machine comprising: a hammer having a tailpiece; actuating means engageable with respect to said tailpiece to lift said hammer and disengageable with respect to said tailpiece to drop said hammer; mechanism having an oscillatable rod operatively connected to said actuating means for effecting engagement and disengagement of said actuating means; a cam member movably mounted on said rod and adapted to be engaged by said hammer during its movement to actuate said rod; a rotatable screw adapted to be rotated during rise and fall of said hammer; and a nut on said screw, operably connected with said cam member to effect adjustment of said cam on said rod when said screw is rotated to thus vary the stroke of said hammer, said cam normally being positioned to bring about relatively short strokes of said hammer; and automatically operable means controlling rotation of said screw for returning said cam to normal position following adjustment thereof to vary the stroke of said hammer.

3. A drop hammer machine comprising: a hammer having a tailpiece; opposed rolls mounted upon eccentric bearings, approachable with reference to said hammer to engage said tailpiece and elevate said hammer, and separable to disengage said tailpiece to permit said hammer to drop; mechanism for effecting engagement and disengagement of both of said rolls; an oscillatable rod; a reciprocable cam operable by said rod and movable in a path at an angle to the longitudinal axes of said rolls; a cam member movably mounted on said rod and adapted to be engaged by said hammer during its movement to actuate said rod; a rotatable screw adapted to be rotated during rise and fall of said hammer; and a nut on said screw, operably connected with said cam member to effect adjustment of said cam member on said rod and effect disengagement of said actuating means at different heights to thus vary the stroke of said hammer.

4. A drop hammer mechanism, comprising: a hammer unit, including a hammer; opposed rolls mounted upon eccentric bearings, approachable with reference to said hammer unit to engage and elevate said hammer unit, and separable to disengage, and permit said hammer unit to drop; actuating means having cranks connected to said eccentric bearings, links connected to said cranks, and a connector connected to said links, said actuating means being movable to effect approach and separation of both of said rolls, said connector carrying a roller and having an adjusting shim interposed between said roller and said connector; and a reciprocable cam operable by movement of said hammer unit for imparting decelerating movement to said actuating means and said rollers.

5. A drop hammer mechanism, comprising: a hammer unit, including a hammer; opposed rolls mounted upon eccentric bearings, approachable with reference to said hammer unit to engage and elevate said hammer unit, and separable to disengage, and permit said hammer unit to drop;

roll actuating means operable to effect relative approach and separation of both of said rolls; control means, controlled by movement of said hammer, and having a reciprocable cam contoured to impart decelerating movement to said roll actuating means and both of said rolls; and a wedge member operable to adjust the operative position of said reciprocable cam with reference to said roll actuating means and thereby to adjust the degree of deceleration.

6. A drop hammer machine, comprising: a hammer head having a tailboard connected thereto; cooperating rollers approachable to engage said tailboard to raise said hammer head and separable to release said tailboard to permit said hammer head to drop, and having one of said rollers mounted in an eccentric bearing, whereby oscillation of said bearing effects approach and separation of said rollers; connections including a weighted member connected to said eccentric bearing and movable in a vertical direction under influence of gravity to cause approach of said rollers; an oscillatable vertical rod actuated by movements of said hammer head, and having a cam surface movable at an angle to the direction of movement of said weighted member, engageable with said connections to lift the weighted member upon movement of said rod in one direction and to permit descent of said weighted member upon movement of said rod in the opposite direction; and means for adjusting said cam and said connections with reference to said cam surface to minimize clearance between said cam surface and said connections.

7. A drop hammer comprising: a hammer head having a tailpiece; means for raising and dropping said hammer head; opposed clamps engageable with said tailpiece for supporting the same against descent, each of said clamps being rotatably mounted upon an eccentric bearing and each bearing having a crank, said cranks being interconnected whereby operation of one effects movement of the other to rotate said eccentric bearings and effect shifting movement of said clamps toward and from each other, one of said clamps having a weighted member normally urging the same in predetermined direction, and the other of said clamps having an operating rod connected thereto, each of said clamps having means projecting into the path of movement of said cranks, whereby movement of said cranks rotates said clamps as well as shifts the same.

FRANK J. VLCHEK.